Figure 1:

No. 671,859. Patented Apr. 9, 1901.
E. T. GILLILAND.
MANUFACTURE OF MOUTHPIECE CIGARETTES.
(Application filed Feb. 1, 1898.)

(No Model.) 5 Sheets—Sheet 1.

WITNESSES:

Ezra T. Gilliland
INVENTOR

BY
ATTORNEY.

No. 671,859. Patented Apr. 9, 1901.
E. T. GILLILAND.
MANUFACTURE OF MOUTHPIECE CIGARETTES.
(Application filed Feb. 1, 1898.)
(No Model.) 5 Sheets—Sheet 2.

WITNESSES:
INVENTOR
Ezra T. Gilliland
By
ATTORNEY

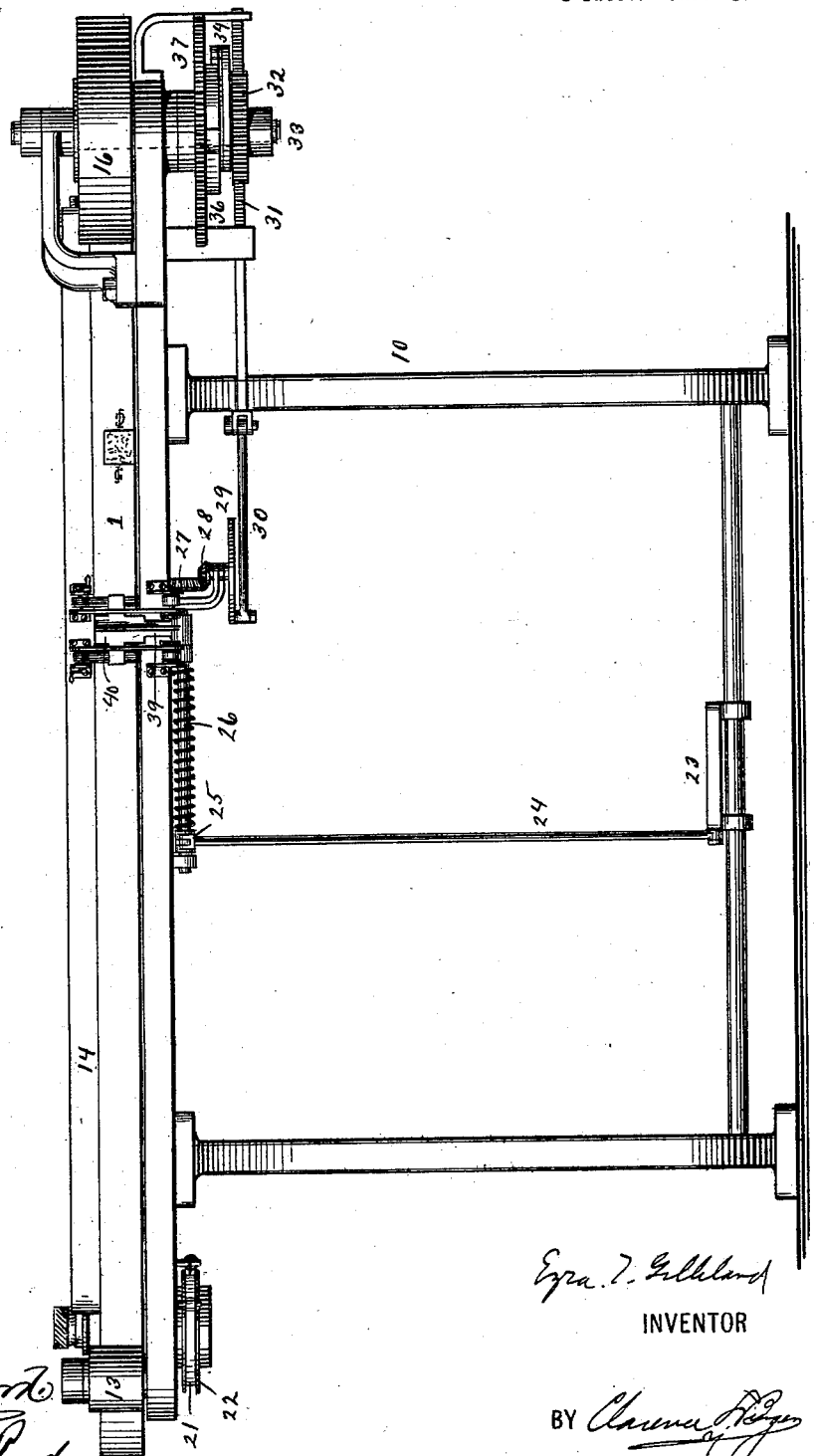

No. 671,859. Patented Apr. 9, 1901.
E. T. GILLILAND.
MANUFACTURE OF MOUTHPIECE CIGARETTES.
(Application filed Feb. 1, 1898.)
(No Model.) 5 Sheets—Sheet 4.
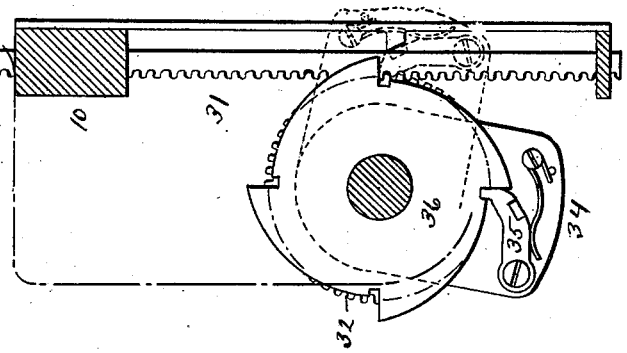
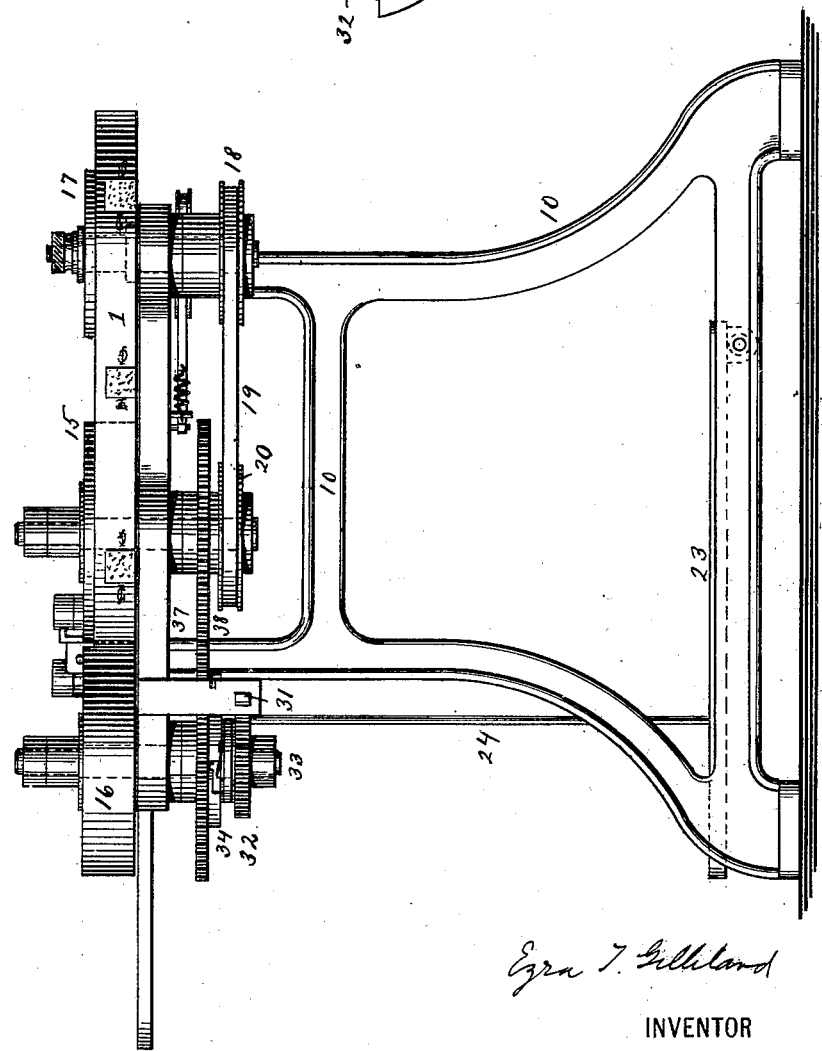
WITNESSES: INVENTOR
Ezra T. Gilliland
BY
ATTORNEY No. 671,859. Patented Apr. 9, 1901.
E. T. GILLILAND.
MANUFACTURE OF MOUTHPIECE CIGARETTES.
(Application filed Feb. 1, 1898.)
(No Model.)
5 Sheets—Sheet 5.
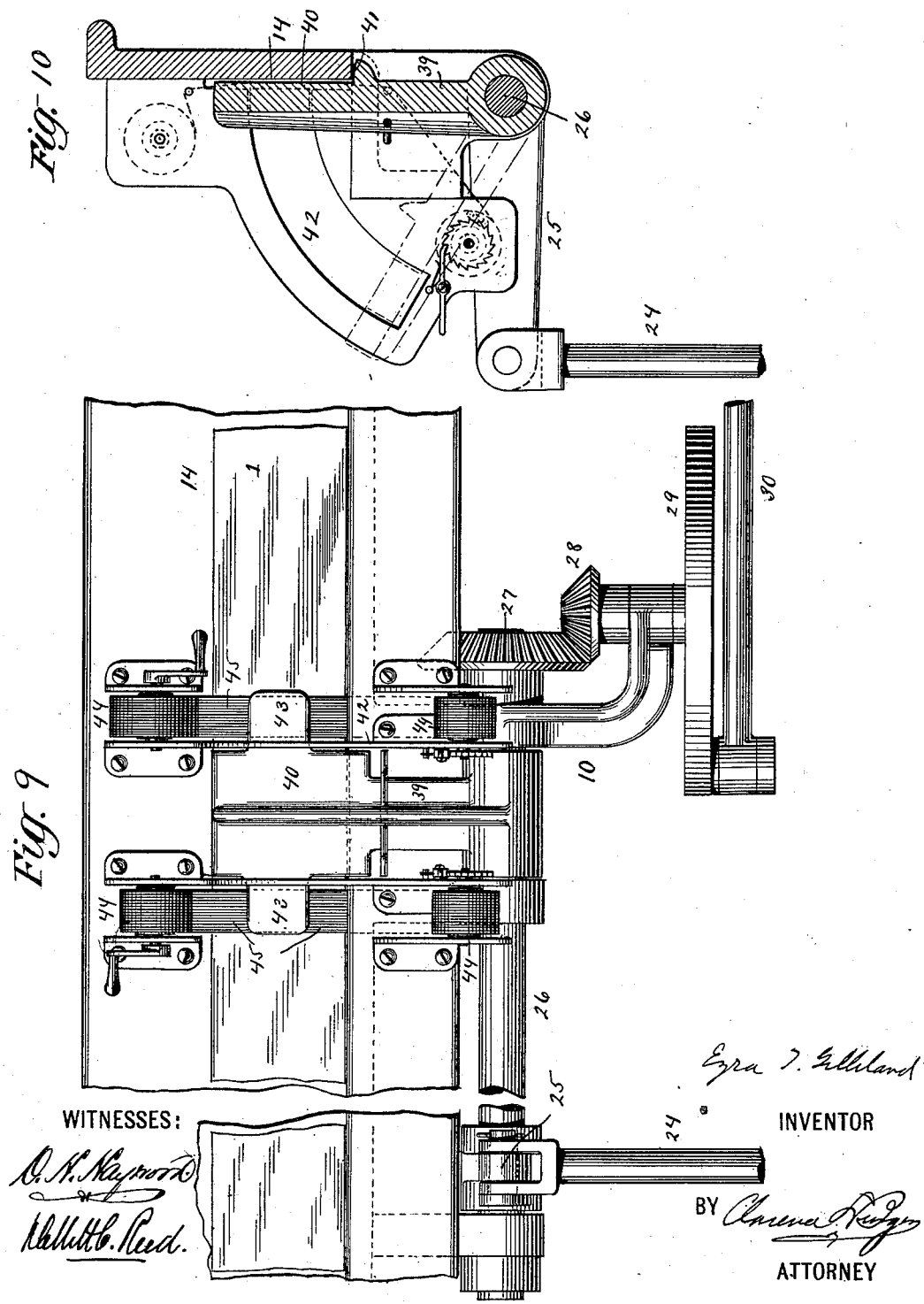
WITNESSES:
INVENTOR
Ezra T. Gilliland
BY
ATTORNEY

UNITED STATES PATENT OFFICE.

EZRA TORRENCE GILLILAND, OF PELHAM MANOR, NEW YORK, ASSIGNOR TO CHARLES P. BUCHANAN AND RODERICK ROBERTSON, OF NEW YORK, N. Y.

MANUFACTURE OF MOUTHPIECE-CIGARETTES.

SPECIFICATION forming part of Letters Patent No. 671,859, dated April 9, 1901.

Application filed February 1, 1898. Serial No. 668,720. (No model.)

*To all whom it may concern:*

Be it known that I, EZRA TORRENCE GILLILAND, a citizen of the United States, residing in Pelham Manor, Westchester county, State of New York, have invented a new and useful Improvement in the Manufacture of Mouthpiece-Cigarettes; and I do hereby declare that the following is a full, clear, and exact description of the same.

Cigarettes without mouthpieces are now made by forming in a manner and by mechanism well known in the art a continuous rod of tobacco or filler around which is wrapped and secured a continuous wrapper-strip and severing the continuous cigarette thus formed into short equal sections forming the individual cigarette. Cigarettes are made in this way much more cheaply and expeditiously than by rolling and wrapping them individually by hand. Cigarettes are also made singly with mouthpieces on one end of some waterproofing, stiffening, or other suitable material—such as cork, paraffin-wax, prepared paper, gold-leaf, or gold-sizing—applied either exteriorly or interiorly to the wrapper to protect the end of the cigarette from the effects of the moisture of and adhering to the lips and from tearing or maceration; but such mouthpiece-cigarettes are expensive, uneven, and imperfect, owing to their present method of manufacture one by one.

The object of my invention is to provide a better, more expeditious, and more economical method of making such mouthpiece-cigarettes, and I accomplish this and other ends by incorporating with the wrapper of a continuous cigarette during the process of manufacture short sections of mouthpiece material, such as above mentioned, at regular intervals and then severing the continuous mouthpiece-cigarette thus formed at regular intervals, so as to form a continuous succession of individual mouthpiece-cigarettes.

I make the sections of mouthpiece material in the continuous cigarette each twice the length of the mouthpiece of a single cigarette and the intervals between said sections each twice the length of the plain portion of a single mouthpiece-cigarette, and to sever the continuous mouthpiece-cigarette at points midway of each section of mouthpiece material and of each interval so that any variation in the points of severance will not impair the individual mouthpiece-cigarettes, as will be hereinafter more fully explained. I also prefer to apply the sections of mouthpiece material to the exterior of the continuous wrapper-strip and to effect this before the wrapper-strip is wrapped around the continuous filler-rod.

To form the continuous filler-rod, to wrap and secure the continuous wrapper-strip around the same, and to finally sever the continuous-wrapped rod into individual cigarettes, I prefer to employ the continuous-cigarette machine invented by me and forming the subject of a separate application for Patent filed by me February 1, 1898, Serial No. 668,719; but any other suitable means or machine may be used for this purpose.

To apply the succession of sections of mouthpiece material to the continuous wrapper-strip, I find it more practicable to use mechanism operating independently of the rod forming, wrapping, and severing mechanism in order that the rapid wrapping and severing operations may not be retarded by the slower process of applying the sections of mouthpiece material to the wrapper-strip. For thus applying the sections of mouthpiece material to the wrapper-strip I have designated a mechanism consisting, briefly, of means for feeding the continuous wrapper-strip along a bed, a movable platen for applying the sections of mouthpiece material at intervals to the wrapper-strip lying on the bed, and means for winding or rolling up the wrapper-strip thus prepared until ready and required for use in the rod wrapping and severing operations. I also utilize the platen to carry a stamp for printing or impressing a mark or symbol at intervals on the wrapper-strip, thus marking the individual mouthpiece-cigarettes afterward wrapped therewith.

In order that my invention may be fully understood, I shall now describe more in detail the mode in which I practice my invention.

I shall refer by numbers to the accompanying drawings, forming part of this specification, in which the same parts are denoted by like characters throughout.

Figure 2:
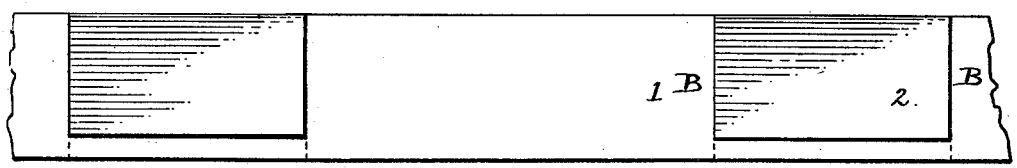
Figure 3:
Figure 4:
Figure 5:
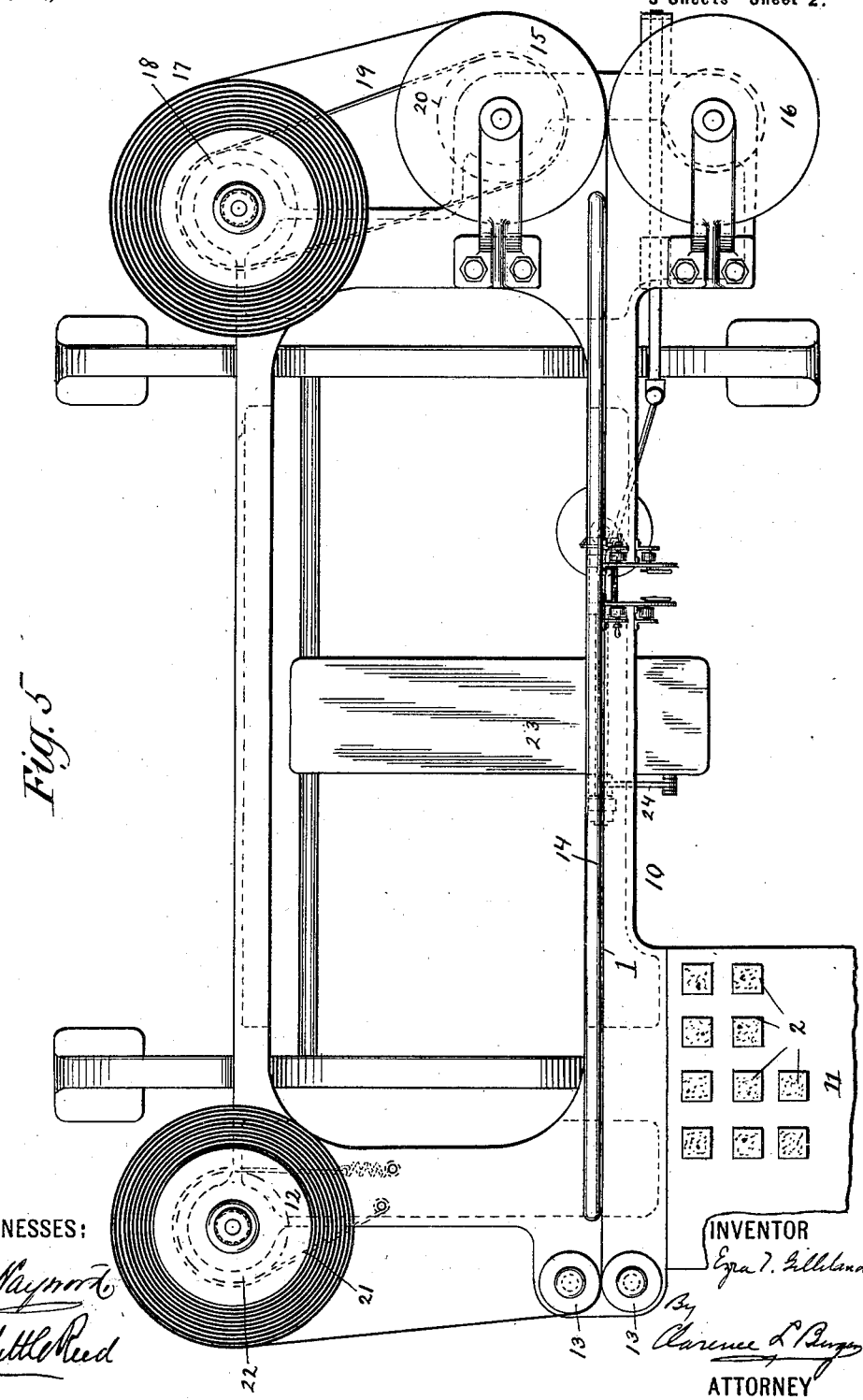

Figure 1 illustrates the mode in which I make and cut up the continuous mouthpiece-cigarette in accordance with my invention. Fig. 2 illustrates the mode in which I apply the sections of mouthpiece material to the continuous wrapper-strip before wrapping the continuous filler-rod therein. Fig. 3 illustrates the use of a different kind of mouthpiece material in the continuous mouthpiece-cigarette of my invention. Fig. 4 illustrates the application of sections of mouthpiece material in the form of tubes to the interior of the wrapper of the continuous mouthpiece-cigarette. Fig. 5 is a plan view of the mechanism designed for readily applying the sections of mouthpiece material to and marking the continuous wrapper-strip for use in the subsequent cigarette-forming operations. Fig. 6 is a side elevation of the said wrapper-strip-treating mechanism. Fig. 7 is an end elevation of the same. Figs. 8, 9, and 10 are enlarged detail views of different parts of said mechanism, hereinafter described.

In making mouthpiece-cigarettes according to my invention by the specific method illustrated in Figs. 1 and 2, which method is a very desirable one, I apply at suitable intervals to the exterior of the continuous wrapper-strip 1, which is like that commonly used in continuous-cigarette machines, sections of mouthpiece material in the form of thin sheets 2 of cork, or it may be prepared or bronzed paper or tobacco-leaf or other suitable mouthpiece material, which sheets I by preference paste over the wrapper-strip and thoroughly dry before using in the cigarette-forming machine.

In the method illustrated in Fig. 3 I apply at intervals and by suitable means sections 3 of liquid paraffin-wax or other suitable mouthpiece material in liquid or viscous form to the exterior of the wrapper-strip 1, likewise drying the same before using the wrapper-strip in the cigarette-forming machine.

In the methods illustrated in Figs. 1, 2, and 3 I usually but not always prefer to leave a margin on one side of each section of mouthpiece material, as shown, so that when the prepared wrapper-strip 1 is subsequently wrapped and pasted or secured around the filler-rod 4 there will be no mouthpiece material between the lapping edges of the wrapper-strip which would or might cause the wrapper to leak at the seam or prevent the paste from properly securing the edges of the wrapper. The continuous wrapper-strip 1, with which the sections of mouthpiece material are thus incorporated, is, when ready for use, wrapped and secured around the continuous filler-rod 4 by the continuous-cigarette machine or other suitable means to form the continuous mouthpiece-cigarette shown in Figs. 1 and 3.

In Fig. 4 I have illustrated another but less desirable method of performing my invention—namely, by applying the sections of mouthpiece material to the interior of the wrapper-strip 1. This may be accomplished by wrapping the wrapper-strip, prepared as shown in Fig. 2, around the filler-rod 4, with the mouthpiece sheets or material on the inside against the filler, or, as illustrated in Fig. 4, forming the filler-rod 4, then severing the same into sections and separating the sections endwise by suitable intervals, then interposing the sections of mouthpiece material in the form of paper tubes 5 between the sections of filler, and then wrapping and securing the wrapper-strip 1 around the line of alternating tubes 5 and filler-sections 4, thus incorporating the mouthpiece-tubes 5 with the wrapper of the continuous mouthpiece-cigarette thereby formed.

By whatever method I make this continuous mouthpiece-cigarette I prefer to make the sections of mouthpiece material twice the length of the mouthpiece of a single cigarette and the intervals between the said sections of twice the length of the plain portion of a single mouthpiece-cigarette and to sever the continuous cigarette into individual cigarettes at points midway of each section of mouthpiece material and of each plain portion between the said sections, as shown in Figs. 1, 3, and 4. Thus a single mouthpiece-cigarette will be formed of the half of each mouthpiece portion and the adjoining half of the plain portion of the cigarette, and if the points of severance are inexact, as they are apt to be, such irregularity will not affect the quality or character of the individual cigarettes.

It will be seen that if the sections of mouthpiece material were of single mouthpiece length and the intervals of single length likewise and severance effected at the junction of said mouthpiece and plain portions a variation in the point of severance would cause the individual cigarettes to have either a bit of mouthpiece material on the lighting end or a bit of unprotected wrapper on the mouth end of the cigarette, which would greatly impair the quality of the cigarettes.

The severance of the continuous mouthpiece-cigarette into individual mouthpiece-cigarettes is effected in the continuous-cigarette machine by a proper adjustment of the cutting mechanism or by other suitable means.

To apply and paste the sections of mouthpiece material in the form of sheets 2, as of cork, as illustrated in Fig. 2, to the wrapper-strip 1 at the proper intervals, I have designated the mechanism illustrated in Figs. 5, 6, 7, 8, 9, and 10, although any other suitable means may be employed. This mechanism comprises a frame 10, to which is fixed a table 11, on which the sheets 2, previously coated with paste or other adhesive material, are laid ready for application to the wrapper-strip 1. On the frame 10 is mounted to revolve in a horizontal plane a reel 12, on which the continuous wrapper-strip is wound and from which it is fed between rolls 13 along a vertical bed 14 to and between feed-rolls 15 16, and thence again wound on a receiving-reel 17, having a pulley 18, connected by a slack belt 19 with a pulley 20 on the shaft of the feed-roll 15, so that by rotating the feed-rolls 15 16 the wrapper-strip 1 is fed from the supply-reel 12 over the vertical bed 14 and wound on the receiving-reel 17. A spring-pulled brake-band 21, leading over a pulley 22 on the shaft of the supply-reel 12, keeps the latter from unwinding too fast, and the belt 19 slipping on the pulley 20 keeps the same from winding up the strip too fast as the diameter of the roll increases. For intermittently rotating the feed-rolls 15 16, and thus intermittently feeding the strip 1 along the bed 14, I provide a treadle 23, connected by a rod 24 with the arm 25 of a spring-returned rock-shaft 26, on which is fixed a bevel-gear 27, engaging a bevel-gear 28 on the short shaft of a crank-wheel 29. The crank-wheel 29 is connected by a pitman 30 with a longitudinally-reciprocating rack-bar 31, whose teeth mesh with a spur-wheel 32 on a short vertical shaft 33, to which is fixed an arm 34, carrying a spring-pressed pawl 35, engaging a ratchet-wheel 36, and said ratchet-wheel is fixed to the shaft of the feed-roll 16, which through the spur-gears 37 38 simultaneously rotates the feed-roll 15 and the receiving-reel, as before described. By this mechanism as the treadle 23 is operated by the foot of the operator the wrapper-strip is intermittently fed along the vertical bed 14 in steps each equal to the desired distance between the sections of mouthpiece material on the strip.

To apply and press the paste-coated sheets 2 upon the strip after each advance and while it is stationary, I fix upon the rock-shaft 26 a vertically-swinging arm 39, carrying a platen 40, having a rest 41, on which platen when lowered the operator accurately places one of the sheets 2 against the rest 41. On operating the treadle 23 the platen 40, which moves in guides 42, carries the sheet against the strip 1, lying on the vertical bed 14, and causes the sheet 2 to adhere firmly thereto, after which the platen again descends to receive the next sheet, and the strip 1 is simultaneously fed forward into position to receive the next sheet at the proper interval from the preceding sheet.

I prefer to provide for marking the completed cigarettes with any desired symbol or lettering by forming the platen with ears 43 on opposite sides, carrying the desired stamps or type, and arranging inking-reels 44 and ribbons 45 over the strip 1, so that as the platen applies each mouthpiece-sheet 2 to the strip 1 the strip will be simultaneously marked with the desired symbol or lettering on opposite sides of the sheet, and thus said mark or lettering will appear immediately in advance of the mouthpiece of each of the cigarettes afterward made from said wrapper-strip, as indicated in Figs. 6 and 7 and by B in Figs. 1 and 2.

What I claim as my invention is—

The method of making mouthpiece-cigarettes, which consists in applying to a continuous cigarette, sections of mouthpiece material of the width of two mouthpieces, these sections being applied at intervals of the length of two cigarettes, and then cutting up the continuous cigarette into cigarettes of proper length, the sections of mouthpiece material being cut in two, each thus forming the mouthpiece of two cigarettes, and the plain portions of the wrapper being cut in two midway between the adjacent portions of mouthpiece material, substantially as described.

In testimony whereof I have hereunto set my hand this 15th day of January, 1898.

EZRA TORRENCE GILLILAND.

In presence of—
CLARENCE L. BURGER,
WILLIAM CHARLES TEEL.